June 2, 1970   E. A. HOLLENBACH   3,515,300
FORK LIFT TRUCK WITH A MAST PIVOTAL ABOUT A VERTICAL AXIS
Original Filed Aug. 6, 1965   14 Sheets-Sheet 1

INVENTOR.
Edwin A. Hollenbach,
BY
Paul + Paul
ATTORNEYS.

June 2, 1970  E. A. HOLLENBACH  3,515,300
FORK LIFT TRUCK WITH A MAST PIVOTAL ABOUT A VERTICAL AXIS
Original Filed Aug. 6, 1965  14 Sheets-Sheet 4

INVENTOR.
*Edwin A. Hollenbach,*
BY
*Paul & Paul*
ATTORNEYS.

June 2, 1970     E. A. HOLLENBACH     3,515,300
FORK LIFT TRUCK WITH A MAST PIVOTAL ABOUT A VERTICAL AXIS
Original Filed Aug. 6, 1965     14 Sheets-Sheet 5

INVENTOR.
*Edwin A. Hollenbach,*
BY
*Paul + Paul*
ATTORNEYS.

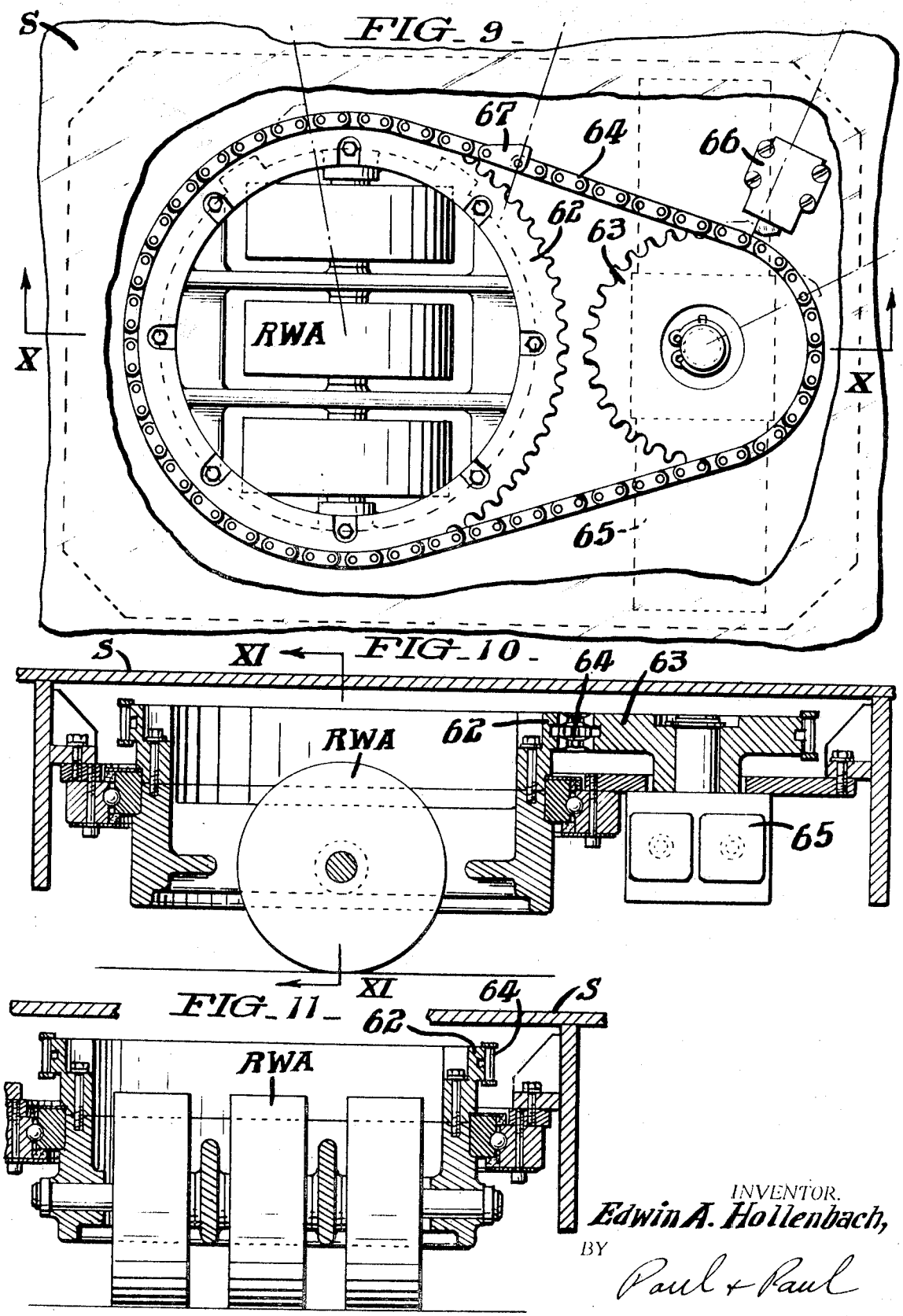

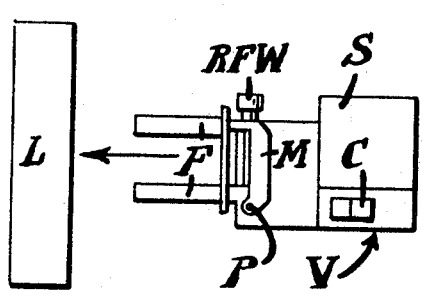
FIG_12_
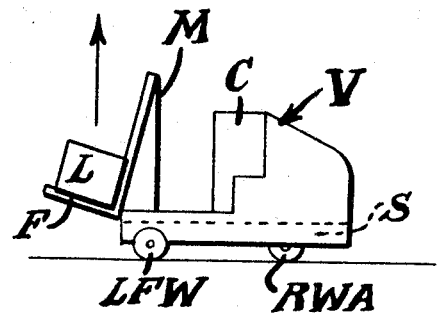
FIG_13_
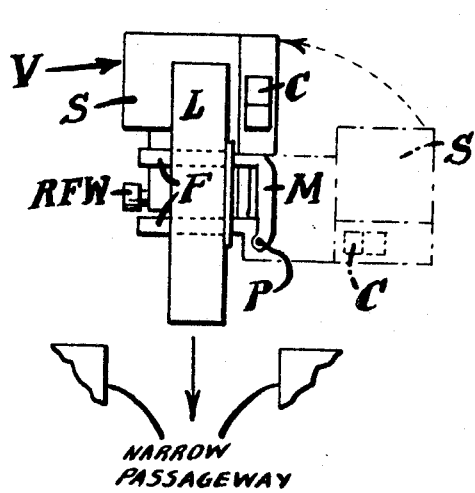
FIG_14_
NARROW PASSAGEWAY
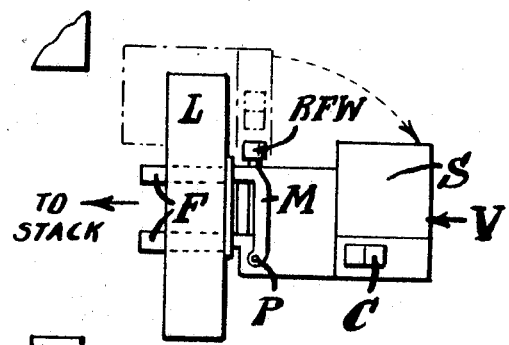
FIG_15_
INVENTOR.
Edwin A. Hollenbach,
BY
Paul + Paul
ATTORNEYS.

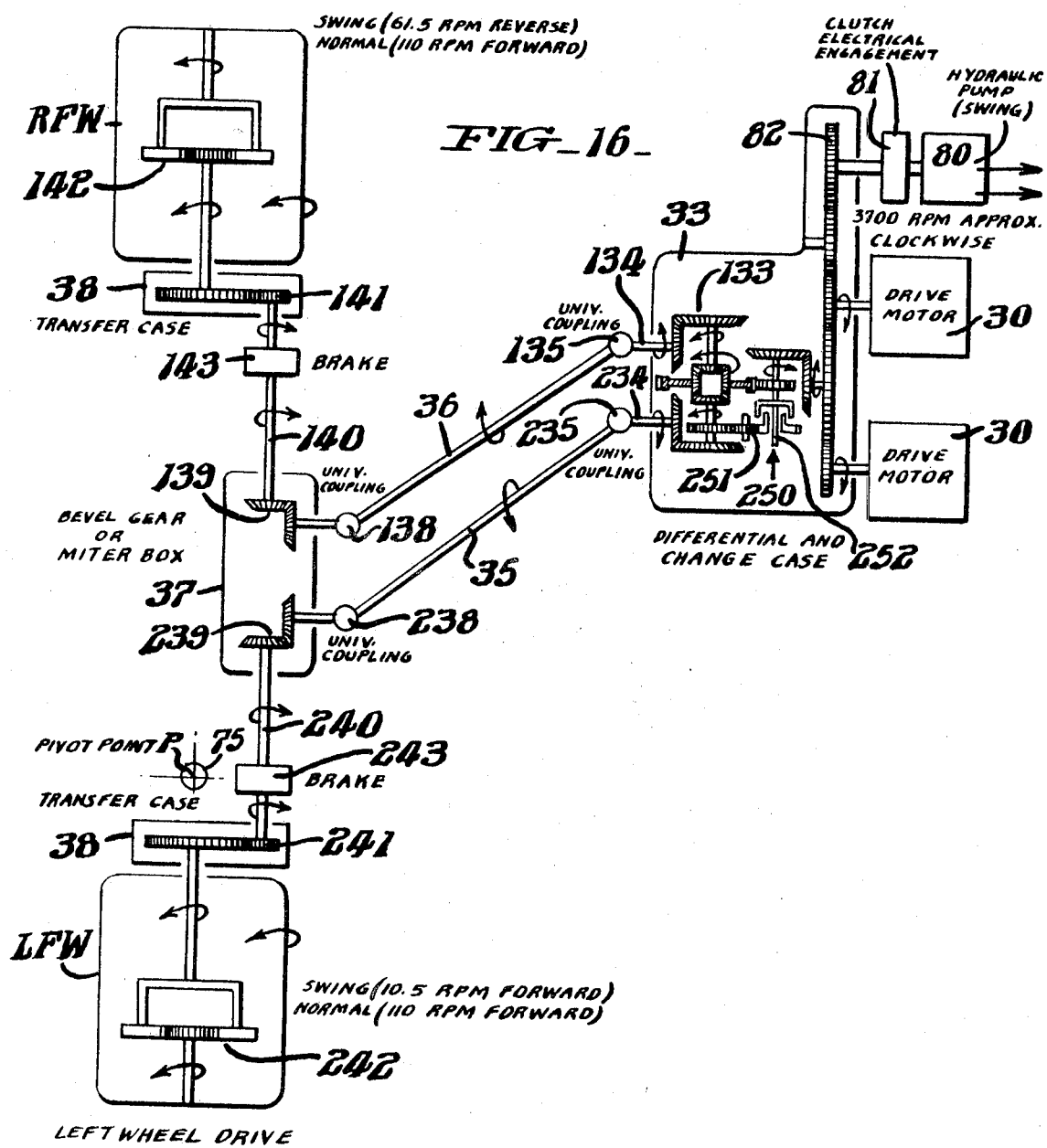

June 2, 1970 — E. A. HOLLENBACH — 3,515,300
FORK LIFT TRUCK WITH A MAST PIVOTAL ABOUT A VERTICAL AXIS
Original Filed Aug. 6, 1965 — 14 Sheets-Sheet 12
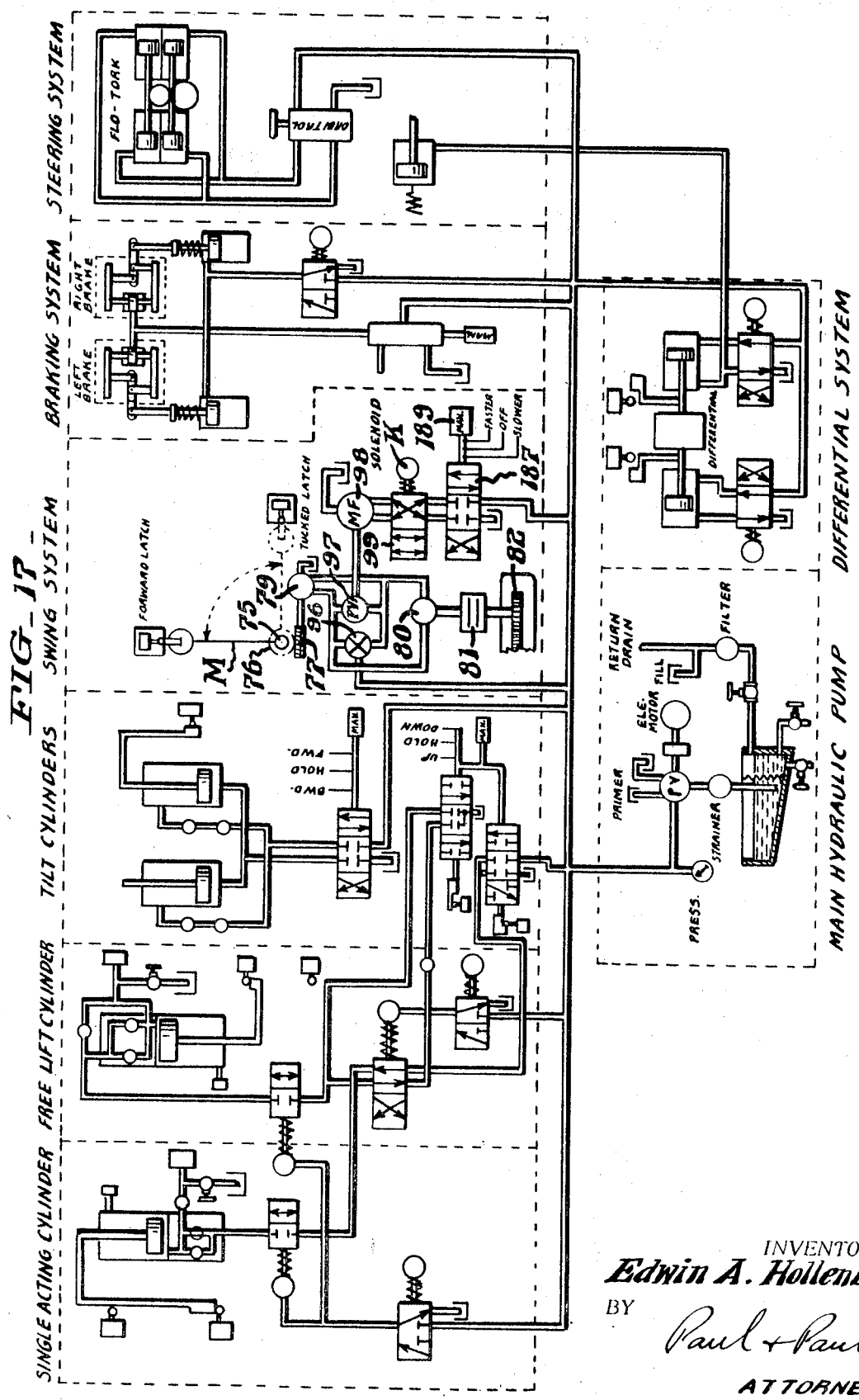
INVENTOR.
*Edwin A. Hollenbach,*
BY
*Paul & Paul*
ATTORNEYS.

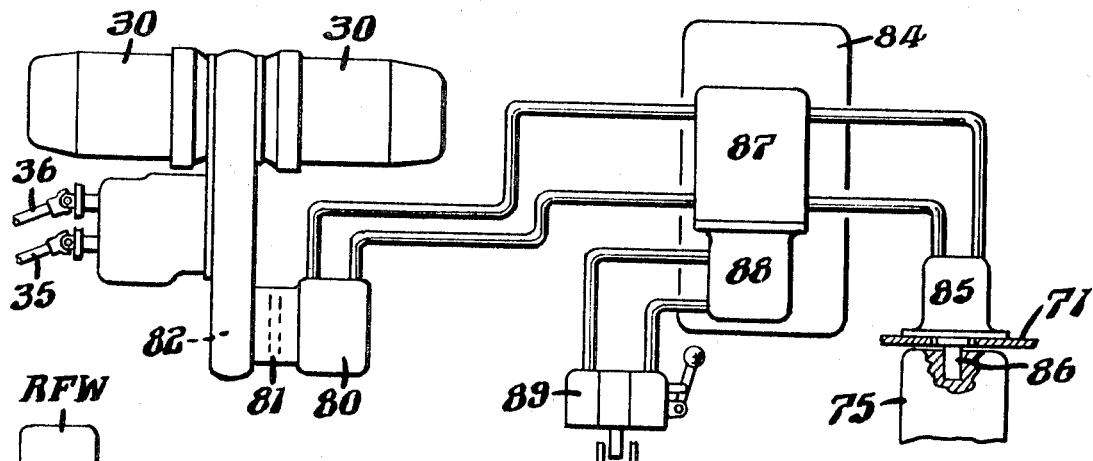
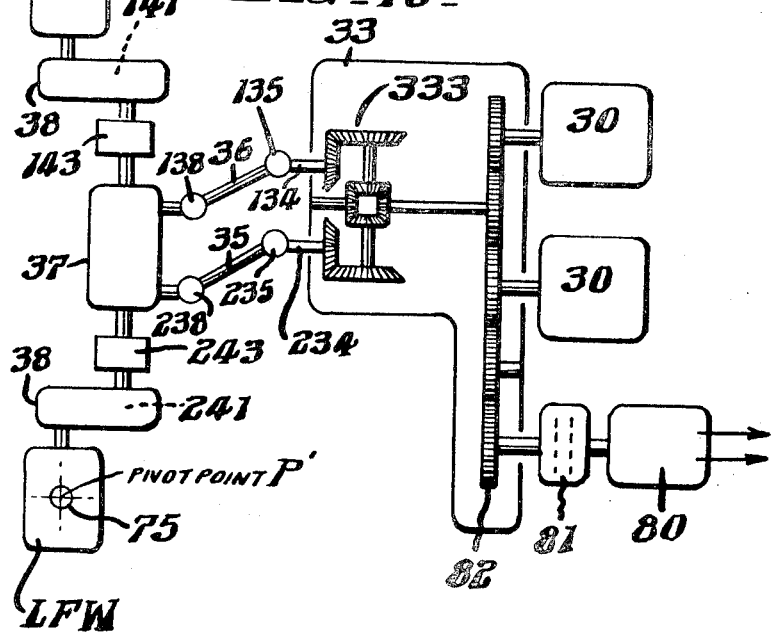

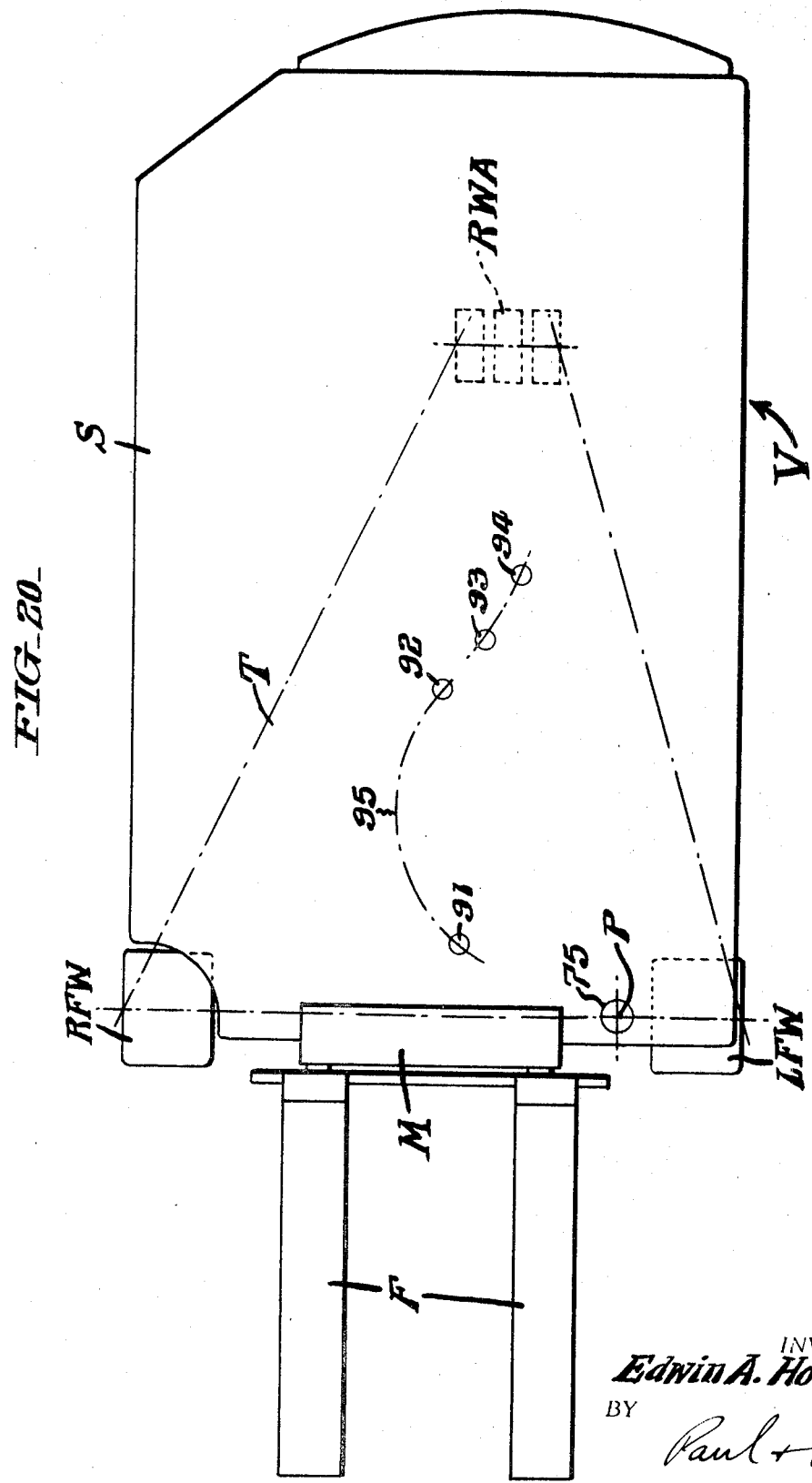

United States Patent Office 3,515,300
Patented June 2, 1970

3,515,300
FORK LIFT TRUCK WITH A MAST PIVOTAL ABOUT A VERTICAL AXIS
Edwin A. Hollenbach, Paoli, Pa., assignor, by mesne assignments, to The Philadelphia National Bank, Philadelphia, Pa., a national banking association
Original application Aug. 6, 1965, Ser. No. 477,904. Divided and this application July 15, 1968, Ser. No. 760,374
Int. Cl. B65g 47/00
U.S. Cl. 214—671                               1 Claim

ABSTRACT OF THE DISCLOSURE

A fork lift vehicle is disclosed having two spaced-apart front drive wheels and a steerable rear wheel assembly. A rotatable pivot post is vertically mounted in one front corner portion of the chassis over the center of one of the front wheels. The fork lift mast is cantilever supported across the front of the vehicle, to one side only of the rotatable pivot post. The vehicle is pivotally swung about the axis of the pivot post to "tuck" the load at the side of the vehicle, the fork lift mast and its load being maintained stationary relative to ground as the vehicle is swung under the fork-supported load.

This application is a division of parent application Ser. No. 477,904, filed Aug. 6, 1965, now abandoned, by Edwin A. Hollenbach, entitled "Fork Lift Vehicle."

This invention relates to a material handling vehicle.

More particularly, the present invention relates to a fork lift vehicle so designed that, for stacking the load or removing the load from the stack, the vehicle approaches the stack with the tines of the fork extended forwardly from the front of the vehicle, but for transporting the load after pick-up, as through narrow aisles or passageways, the vehicle is pivoted or swung under the load to "tuck" the load on to the side of the vehicle in a carry position which is lengthwise of the line of travel.

A principal object of the invention is to provide a fork lift vehicle of the above type in which the load is maintained stationary relative to ground as the vehicle is swung under the load.

Another object is to provide a fork lift vehicle of the foregoing type in which the pivot point, about which the vehicle is swung, is stationary.

A further object is to provide a vehicle of the foregoing type in which the pivot point is located on the line between two driven front wheels, close to one of the wheels.

A further object is to provide a vehicle of the foregoing type in which the pivot point is over the center line of one of the front wheels of the vehicle.

Another object is to provide a fork lift vehicle of the foregoing type in which the combined center of gravity of the load and vehicle swings in toward the vehicle as the vehicle is swung under the load.

Another object is to provide a vehicle of the foregoing type in which the combined center of gravity of the load and the vehicle remains within the triangulation formed by the two front wheels and a single rear wheel assembly, thereby to eliminate the need for any additional counterweighting to balance the load in the tucked position, and thereby permitting the lifting and transportation of heavier loads with a lighter weight vehicle.

Another object is to provide a fork lift vehicle of the foregoing type in which when the vehicle is swung under the load, the mast (which supports the fork and the load) is rotationally driven in proportion to the angular movement of the vehicle as measured by the revolutions of the wheels of the vehicle.

Still another object is to provide a vehicle of the foregoing type in which a manually operable compensator is provided to allow adjustment of mast rotation to compensate for slippage of the wheels on the floor or road surface.

Another object is to provide a vehicle of the foregoing type in which the load is cantilevered to one side of the king post about which the mast is rotated.

Speaking generally, the fork lift vehicle of the present invention combines into one vehicle the characteristic advantages of both front and side loading vehicles. It may be used to special advantage in the handling of loads of substantial length, since the space required to handle such loads is only that required to swing the vehicle under the elongated load. This is in contrast to some prior art vehicles in which the fork with its load is pivoted on the vehicle while the vehicle remains stationary, or to other prior art vehicles in which the load changes its position relative to ground when the vehicle is turned.

In the fork lift vehicle of the present invention, the load remains stationary relative to ground as the vehicle is swung from the forward to the tuck position. Moreover, the center of gravity of the load never leaves the wheel triangulation, thus providing full stability in rotation and handling.

The invention will be clearly understood from a consideration of the following detailed description of a preferred form of the invention illustrated in the drawings in which:

FIG. 9 is a plan view, broken away, of the pivotal drive for the rear wheel assembly;

FIG. 10 is a side elevational view, in section, of the rear wheel assembly pivotal drive, looking along the line X—X of FIG. 9;

FIG. 11 is a front elevational view, in section, looking along the line XI—XI of FIG. 10;

FIGS. 12, 13, 14 and 15 are diagrammatic representations showing how the fork lift vehicle of the present invention is used in the stacking and transportation of an elongated load;

FIG. 16 is a schematic representation of one form of drive system for the front wheels of the vehicle where the pivot point is between the front wheels, close to one of the wheels;

FIG. 17 is a schematic representation of one form of suitable hydraulic control system for a vehicle having the drive system of FIG. 16;

FIG. 18 is a diagrammatic representation of another form of drive system for the front wheels of the vehicle, where the pivot point is over the center of the left front wheel;

FIG. 19 is a diagrammatic representation of one form of fluid drive for rotating the king post;

FIG. 20 is a sketch showing the locations of the combined centers of gravity of the vehicle and load, for maximum and no load conditions, for the forward and tuck positions.

Referring now to FIGS. 12–15, the load is represented by the reference letter L, and V is the fork lift vehicle having a mast M, a fork F, a cab C, a side platform S, and three wheels, two in the front and a rear assembly centered in the rear. Only the right front wheel RFW is visible in FIGS. 12, 14, 15. The left front wheel LFW and the rear wheel assembly RWA is visible in FIG. 13. The pivot point about which the vehicle V is swung when it is moved from forward to tuck position is indicated by P. This is also the pivot point about which the mast M is rotated.

In FIG. 12, the vehicle V is shown approaching the elongated load L with the tines of the fork F extended from the front of the vehicle.

FIG. 13 is an elevational diagram showing the elongated load L on the tines of the fork F and elevated sufficiently to clear the side platform S of the vehicle.

FIG. 14 is a plan diagram showing the position of the vehicle V after it has pivoted about axis P from the forward or stack position, shown in dot-and-dash line, to the "tuck" or carry position, shown in solid line. It will be seen, in FIG. 14, that the elongated load may be moved through the narrow passageway in the direction of the arrow.

In FIG. 15, there is shown in solid lines the position of the vehicle after it has pivoted around the pivot axis P from the dot-and-dash carry position to the approach and stack position. The elongated load L is now again at the front of the vehicle, and the vehicle is free to move forward in the direction of the arrow to the stack.

Figure 5:
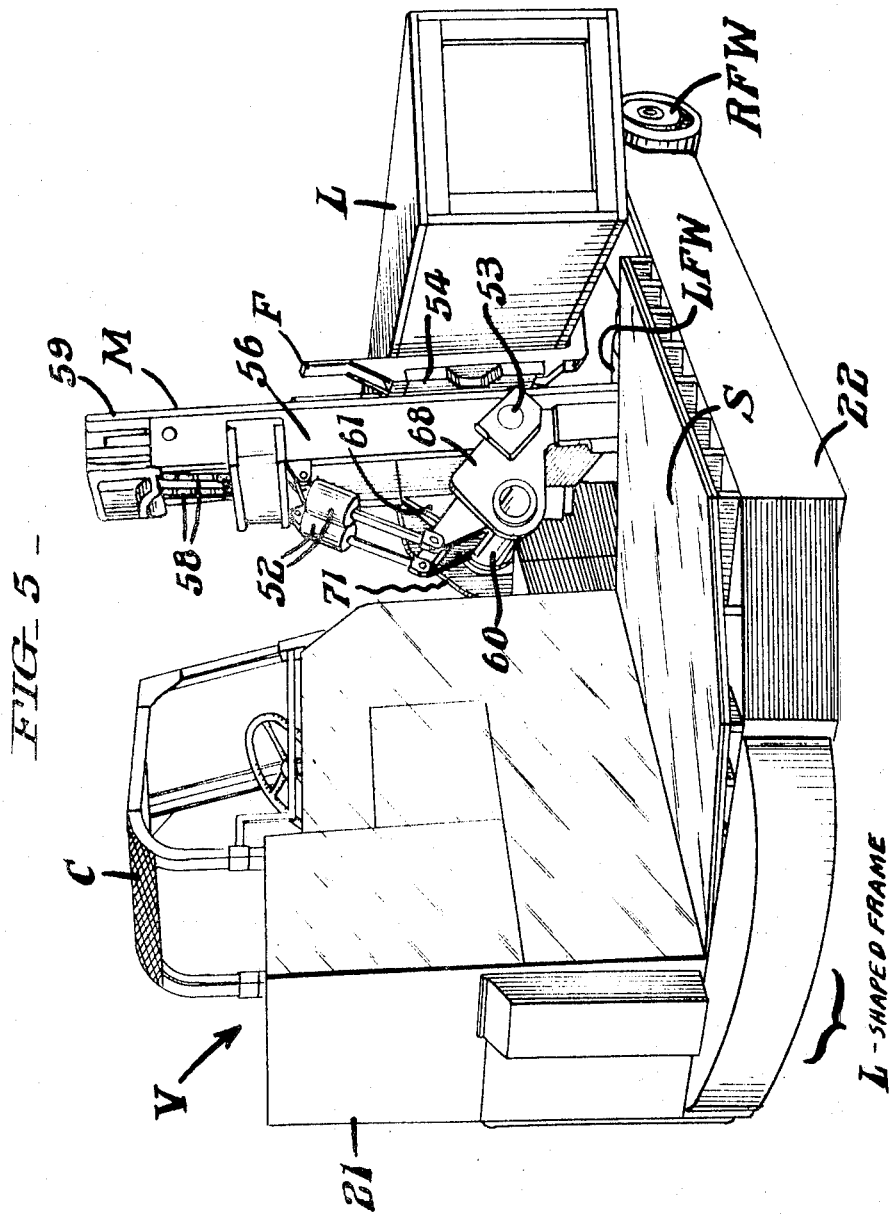
FIG. 5 is a perspective view looking at the vehicle from the right rear showing the vehicle partially under the load.

FIG. 5 is a perspective view of the fork lift vehicle of the present invention, as seen from the right rear, partially swung under the elongated load L. The vehicle includes a generally L-shaped frame having a vertical leg 21 which carries the cab C, and a lateral leg 22 which carries the side platform S. Platform S receives and bears the load L when the truck is swung under the load for carry down a narrow aisle.

In FIG. 5, the truck is illustrated as partly turned under the load L, as is indicated by the position of the right front wheel RFW. Neither of the front wheels is steerable. In one embodiment, in which the pivot point P is over the front drive shaft between the front wheels but close to the left front wheel, pivoting of the vehicle about the pivot point P to swing the vehicle under the load is achieved by rotating the right front wheel forwardly, rotating the left front wheel rearwardly at a reduced rate, and turning the rear wheel assembly RWA to the necessary angular position. In another embodiment, in which the pivot point P is directly over the left front wheel, the left front wheel is locked and the vehicle is pivoted thereabout.

When the vehicle is pivoted about point P, and depending upon the weight of the load, the level of the ground, and other factors, there may be some tendency for the mast M to pivot about the point P in the same direction of rotation as that of the vehicle. Such rotation of the mast and load is not desired, and, accordingly, means are included for automatically rotating the mast M about the pivot point P in a direction counter to that in which the vehicle is swinging, thereby to hold the mast M and the load L stationary, relative to ground, as the vehicle is swung under the load.

Figure 7:
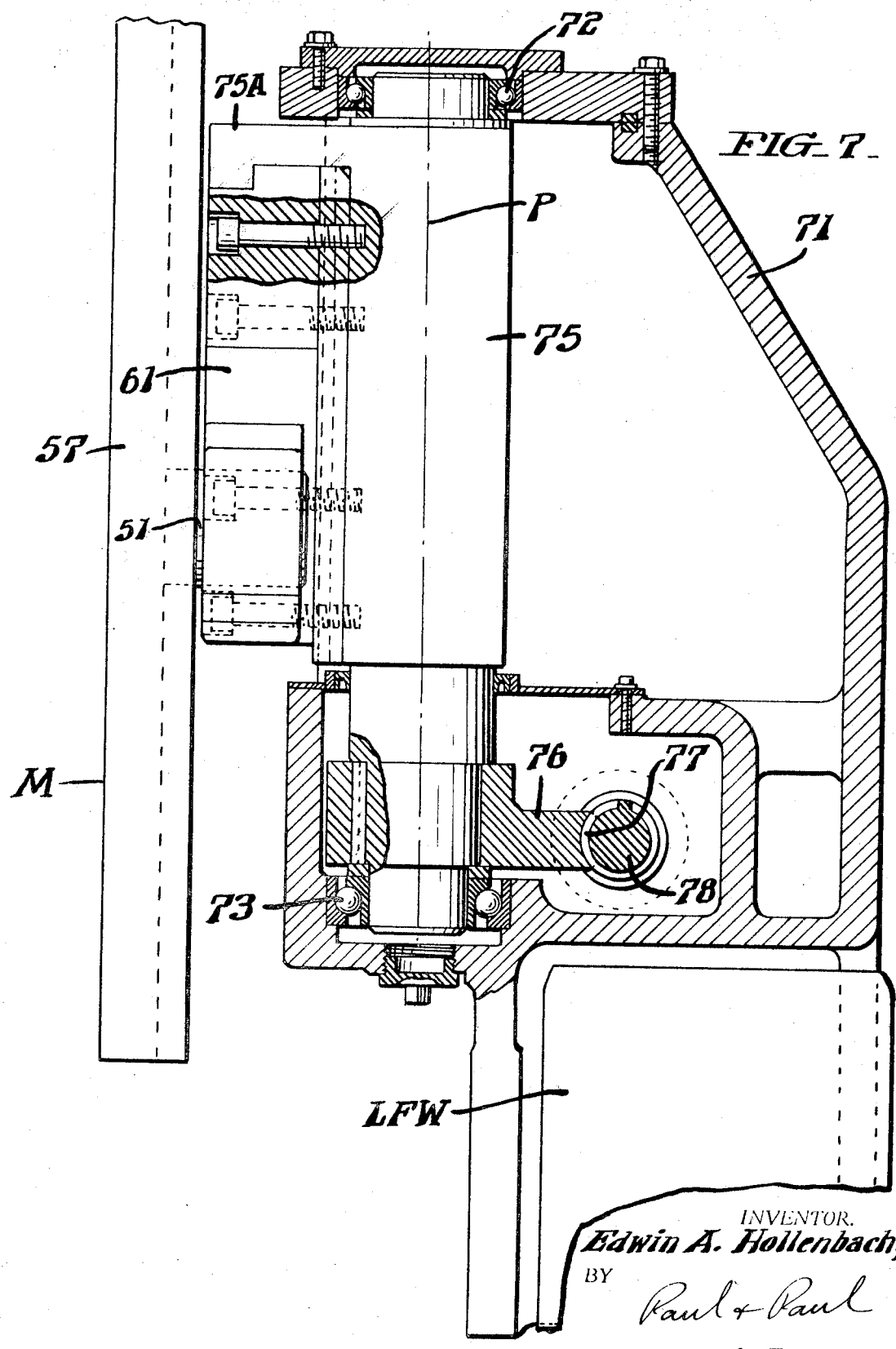
FIG. 7 is a front elevational view, in section, at the pivot point, looking along the line VII—VII of FIG. 6.
Figure 8:
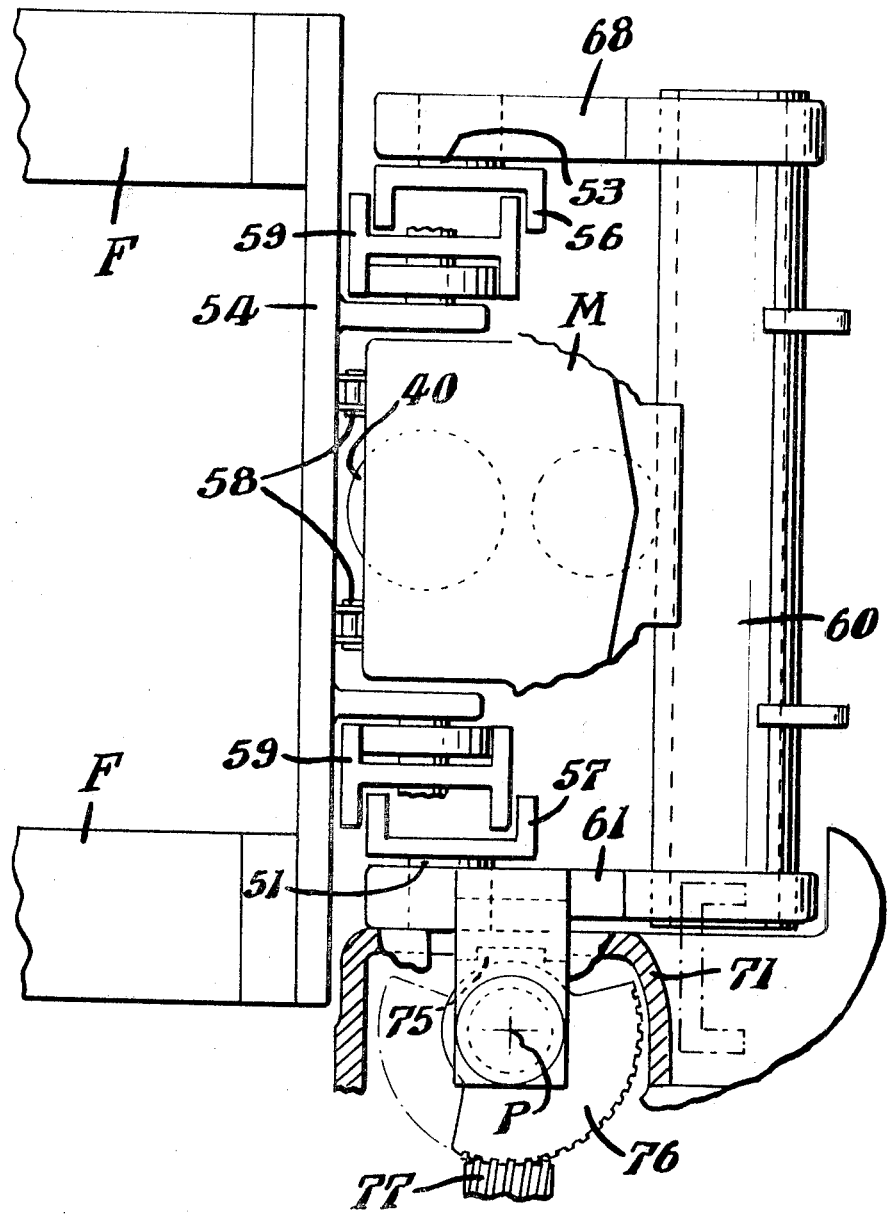
FIG. 8 is a plan view, broken away, of the mast portion of the vehicle.

Projecting forwardly from the left side of the vehicle, in front of the cab, is a housing 71 which supports therein a king post 75, vertically disposed for rotation about a vertical axis P, this being the pivot point P referred to in connection with FIGS. 12–15. Secured to the king post 75 is the left support casting 61 (FIGS. 7 and 8). Casting 61 lies in a vertical plane and extends in the forward to rearward direction. Secured pivotally to the forward portion of the casting 61, as by trunnion 51, is the left outer support member 57 of the mast M. The rearward portion of the casting 61 supports the horizontally and transversely disposed support cylinder 60. Cylinder 60 is supported at one end only. The outward end of the cylinder 60 supports the right support casting 68 (FIG. 8), and pivotally secured to the casting 68, as by trunnion 53, is the right outer support member 56 of the mast M.

It will be seen from the foregoing that the mast M is supported in cantilever manner from the king post 75, about which it is rotatable.

In FIG. 5, the reference numeral 52 indicates the tilt cylinders which control the vertical disposition of the mast M. Retraction of the pistons of the tilt cylinders causes the mast M to pivot about trunnions 51 and 53.

Figure 2:
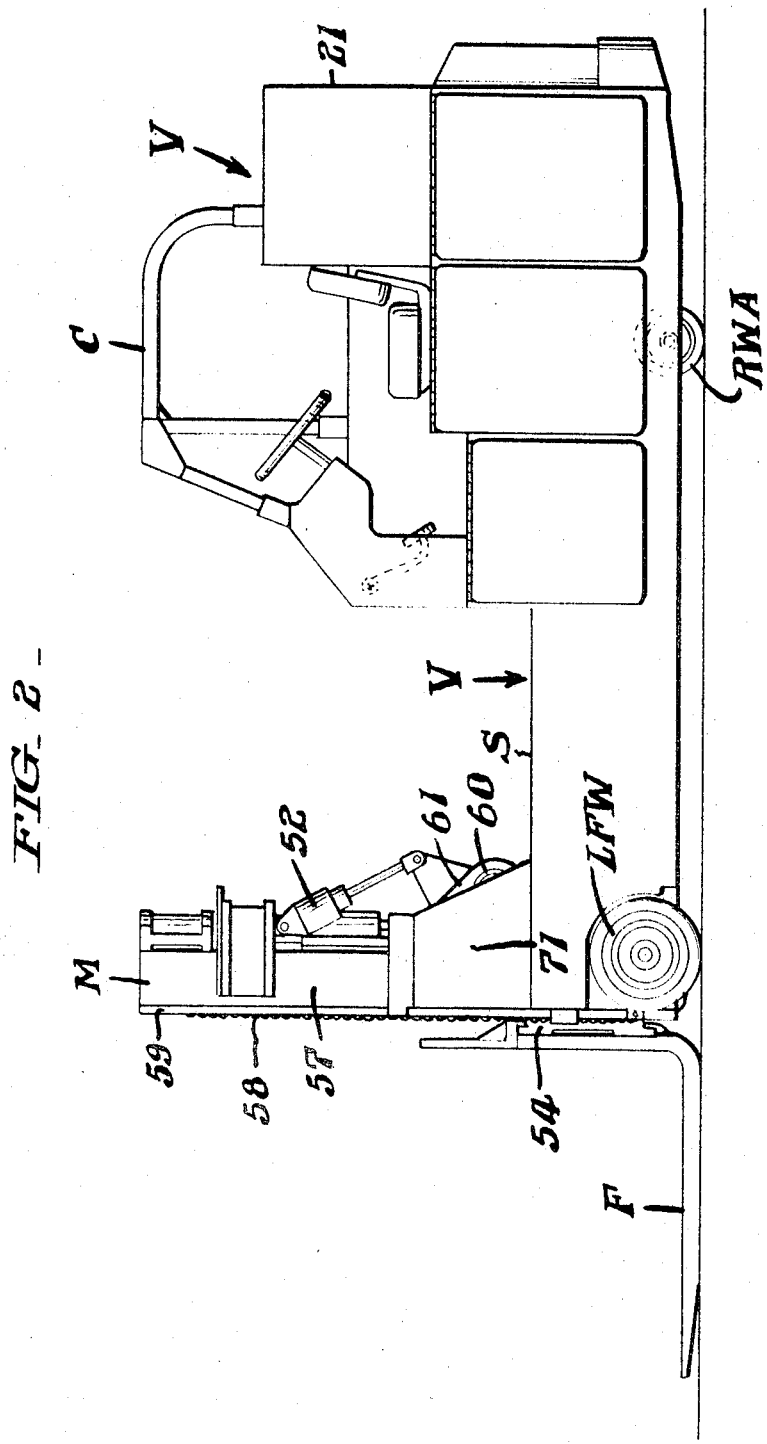
FIG. 2 is an elevational left-side view of the vehicle of FIG. 1.

FIG. 2 is a side elevational view of the left side of the fork lift vehicle showing the fork F extending from the forward end of the vehicle in the lowered position. The fork F is fastened to a carrier 54 which is elevatable by means of a pair of roller chains 58. Before the vehicle is swung under the load L, the fork F is lifted to a sufficient elevation to clear the side platform S of the vehicle.

Figure 1:
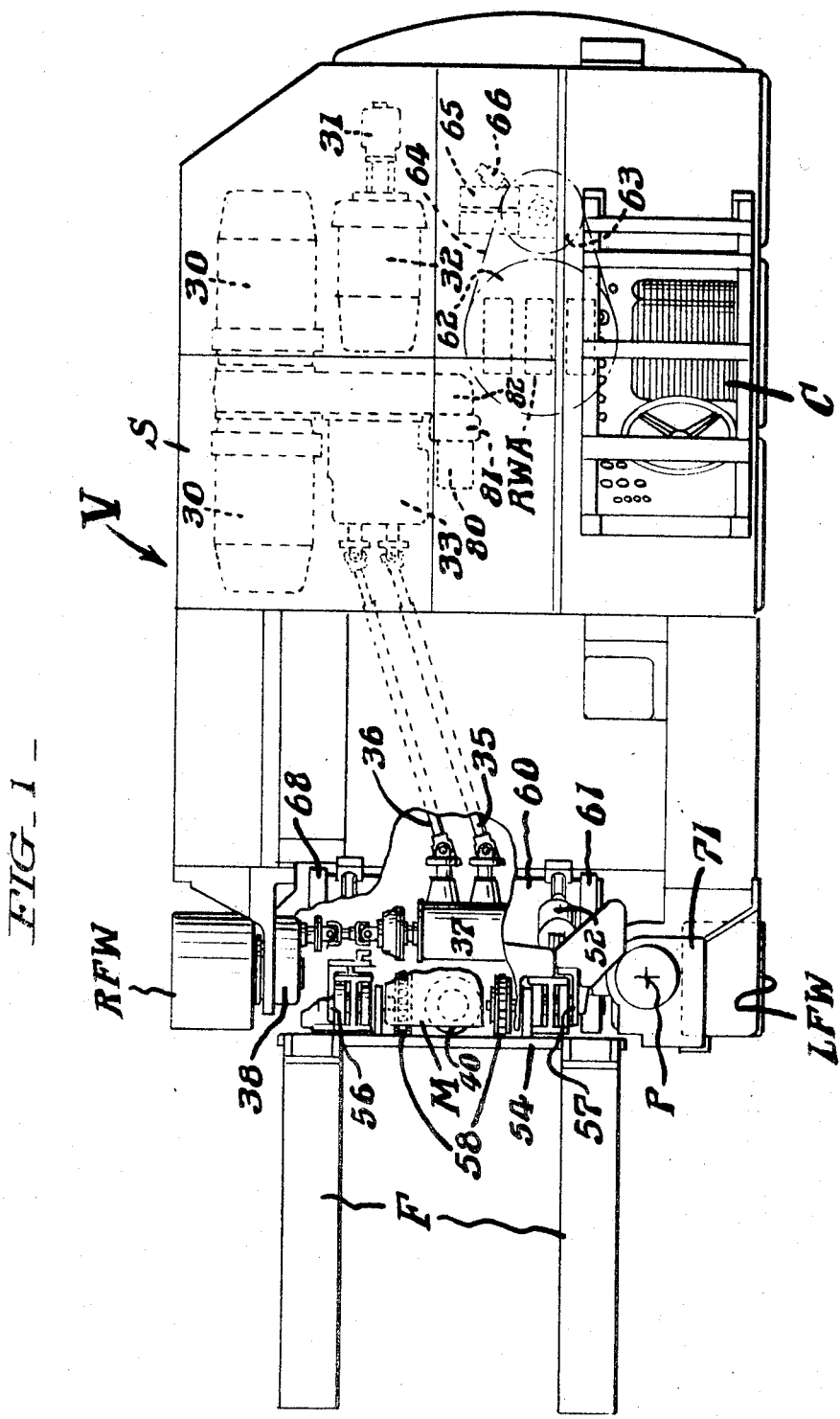
FIG. 1 is a plan view, partly broken away, of the fork lift vehicle of the present invention with the tines of the fork extending forwardly from the vehicle in the normal approach or stacking position.

FIG. 1 is a plan view of the fork lift vehicle of FIG. 2, in which the fork F is shown in the approach or stack position, extending forward of the front wheels. In the embodiment now being described, the pivot point P, about which the vehicle swings, is the center axis of the vertical king post 75.

Depicted in FIG. 1, in dotted lines, are the traction motors 30, the transfer case 33 housing the differential and change gears, and the drive shafts 35 and 36 through which the front wheels are driven. Also shown in dotted lines are the pump 31, the pump motor 32, the three-unit rear wheel assembly RWA, the driven sprocket 62 which pivots the rear wheel assembly, the driving sprocket 63, the chain 64, the fluid motor 65, and the limit stop 66. In the broken-away section of FIG. 1 are shown the bevel drive unit 37, and the right-wheel reduction gear case 38, as well as other parts previously identified.

Figure 4:
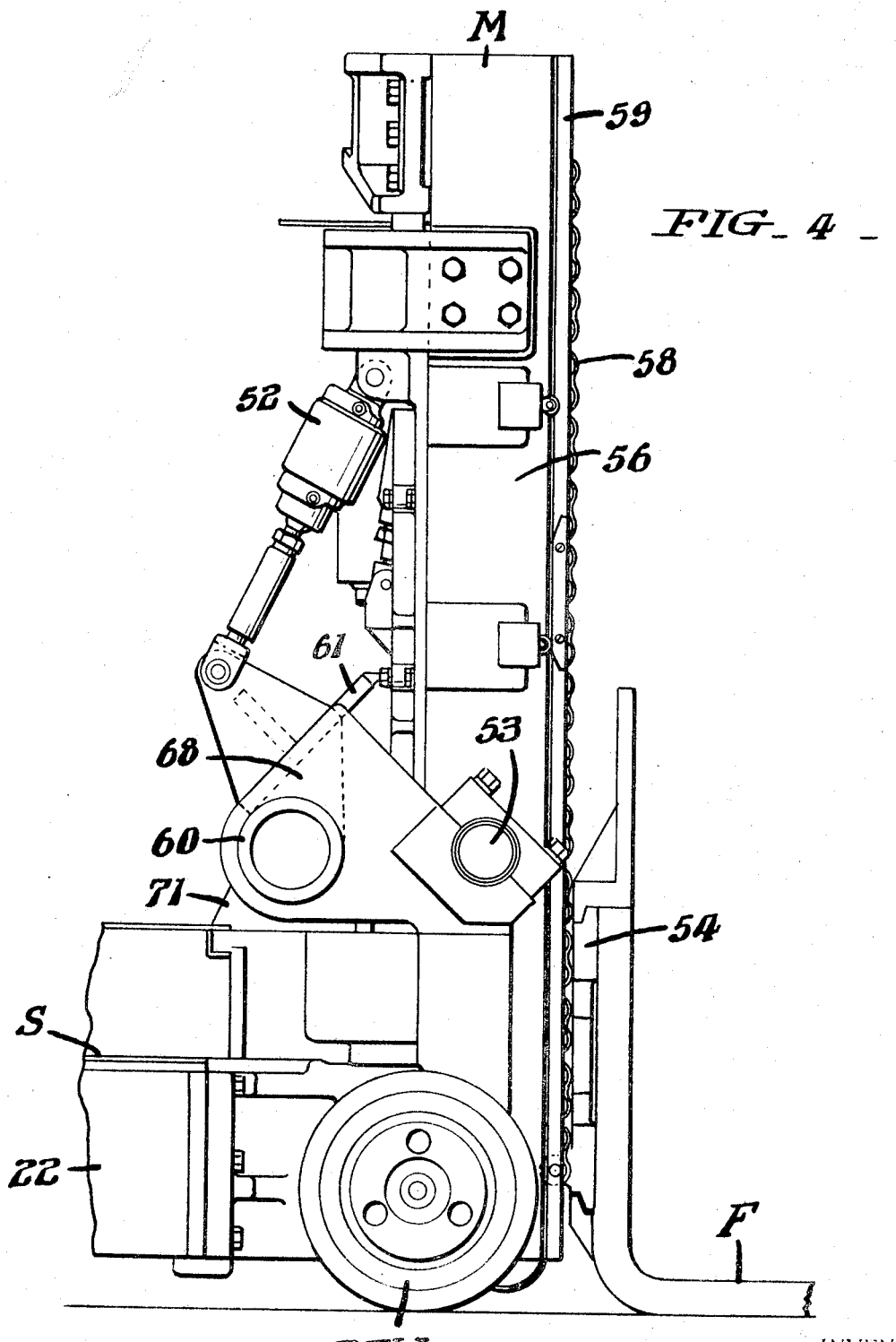
FIG. 4 is an elevational view of a portion of the right side of the vehicle, looking along the line IV—IV of FIG. 3 in the direction of the arrows.

FIG. 4 is a slightly enlarged elevational view of the right side of the mast M, showing the outer right support member 56, one of the telescoping support members 59, the fork carrier 54, one of the roller chains 58 which elevates the carrier 54, the tilt cylinders 52 which tilt the mast M, and one of the tilt trunnions 53 about which the mast is pivotal.

Figure 6:
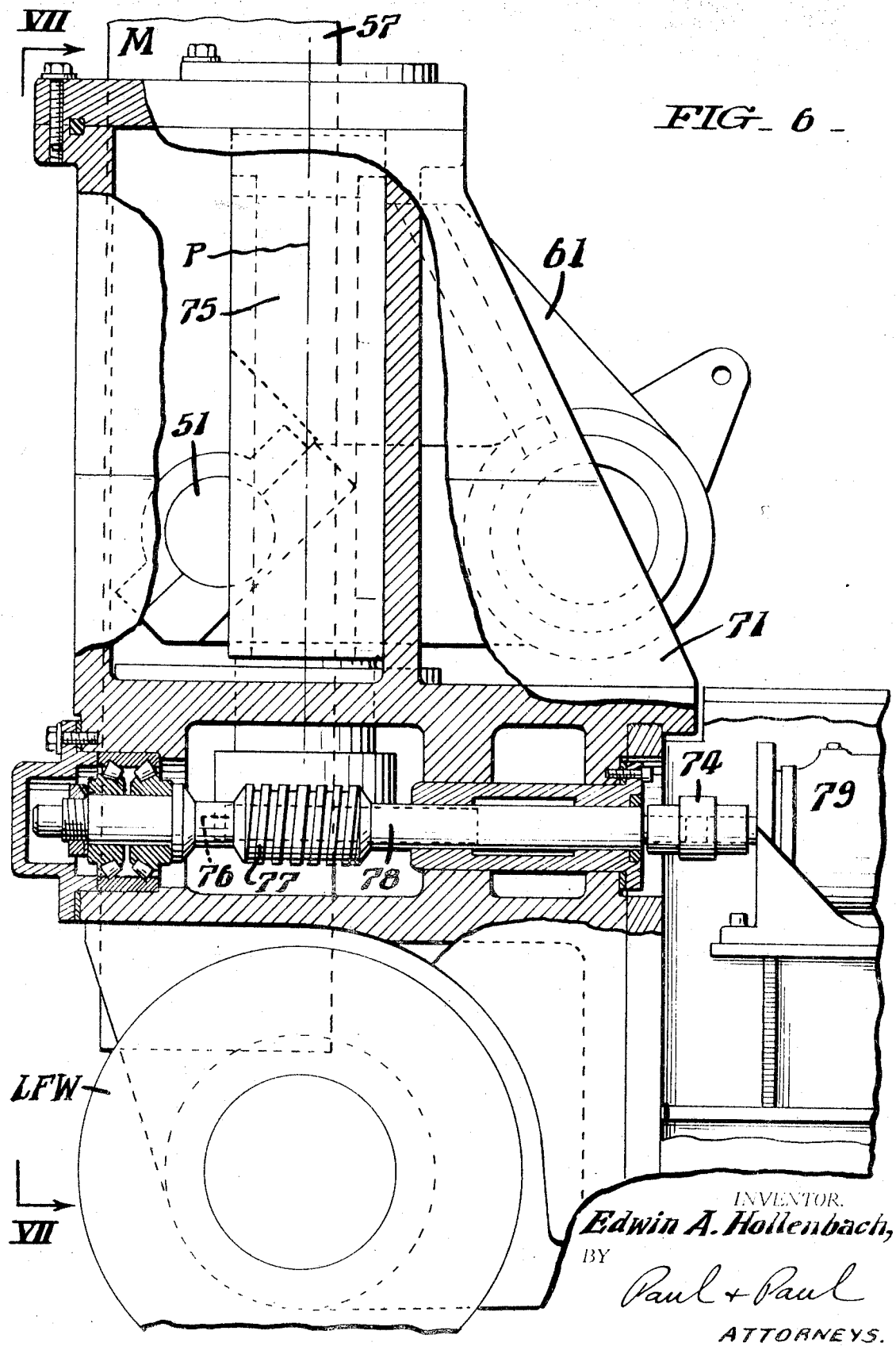
FIG. 6 is an elevational view, partly broken away and in section, of a portion of the left side of the vehicle at the pivot point.

FIG. 6 is a side view, enlarged, and partly broken away, of the portion of the vehicle above the left front wheel LFW. Extending forwardly from the left side of the vehicle chassis is the housing 71 in which is supported the king post 75 which is rotatable about its vertical axis or pivot point P. It is about point P, the axis of the king post 75, that the vehicle pivots as it swings under, or away from the load L. Point P is also the point about which the mast M is rotatable. Pivot post 75 is of generally square cross section, but its ends are cylindrical and supported in suitable upper and lower bearings 72 and 73 respectively (FIG. 7). Extending transversely inwardly from the upper end of the square cross-sectional portion of post 75 is a flange portion 75A, seen best in FIG. 7.

In the embodiment now being described, a worm wheel 76 is keyed to the lower cylindrical end of post 75, above the lower bearing 73. Worm wheel 76 engages a worm 77 which is keyed to worm shaft 78. Shaft 78 is coupled by coupling 74 to a fluid motor 79. Thus, rotation of worm wheel 76 rotates the pivot post 75. As best seen in FIG. 8, the pivot post 75 supports the left casting 61 which supports the transverse cylinder 60 in cantilever fashion, and cylinder 60, in turn, supports the right casting 68. Since the mast M, with its fork F and load L, is supported on the trunnions 51 and 53, which are supported in the castings 61 and 68, it will be seen that when the pivot post 75 is rotated, the mast M and fork F are rotated about the pivot point P (FIG. 8).

FIG. 7 is a front elevational view, partly in section of the housing 71 showing the worm 77, the worm wheel 76, the pivot post 75 journaled in the bearings 72 and 73, and showing the left outer support member 57 of the mast M pivotally supported in the casting 61 which is bolted to the square cross-section portion of pivot post 75.

Figure 3:
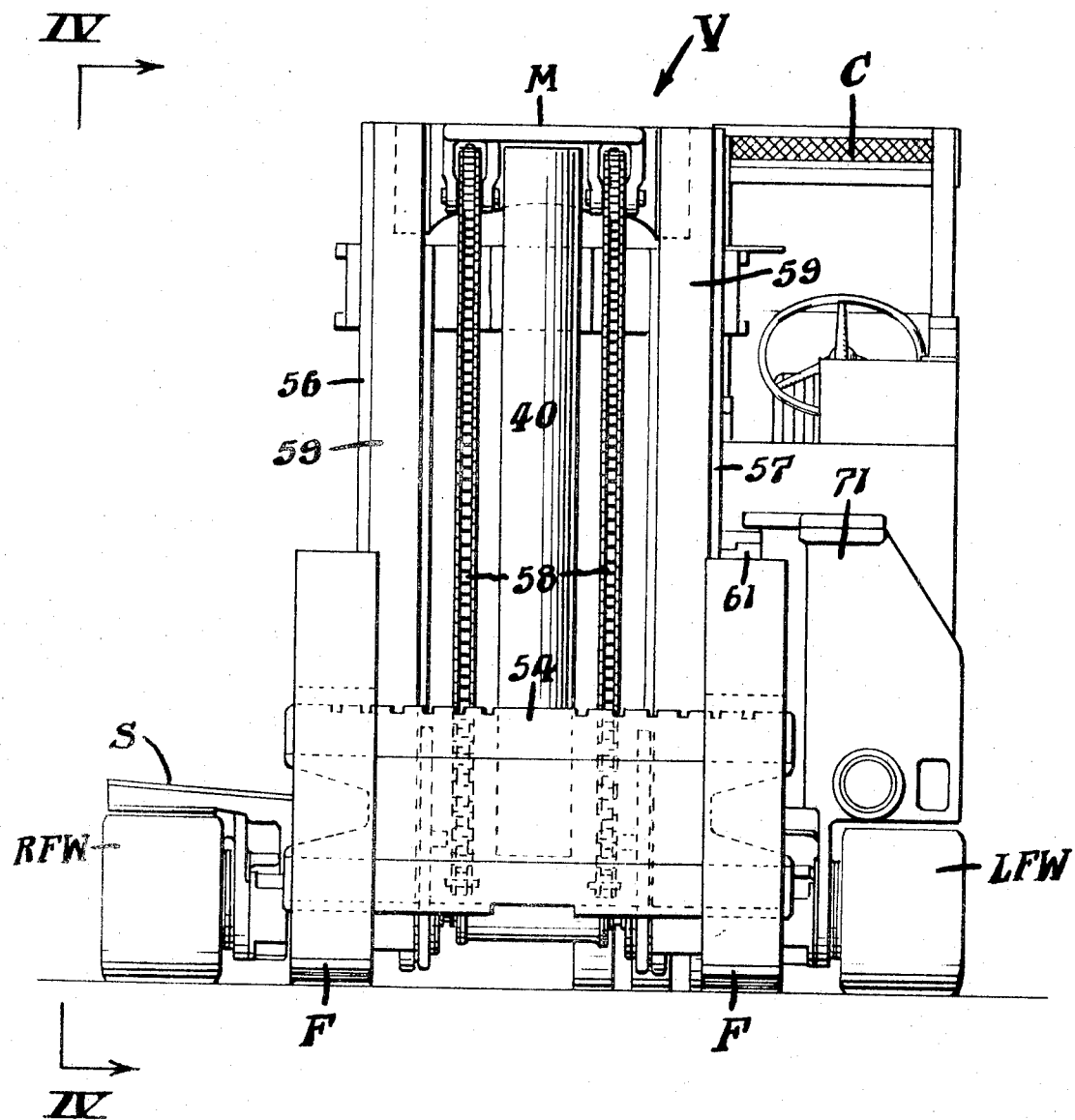
FIG. 3 is a front elevational view of the vehicle of FIG. 1.

FIG. 3 is a front elevation showing the cab C on the left side of the vehicle (to the right as viewed in FIG. 3) and rearward of the housing 71 (in which the king post is supported close to the left front wheel LFW). FIG. 3 also shows the fork F, the elevatable carrier 54 to which the fork is secured, the elevating cylinder 40, the pair of roller chains 58, the right and left outer support members 56 and 57, and the telescoping members 59 which are slidable up and down in the outer support members.

FIG. 8 is a plan view of the mast M, showing a portion of the fork F, the tilt trunnions 51 and 53, the left support casting 61 and the cantilevered cylinder 60 which supports the right support casting 68. Also shown are the outer support members 56 and 57, the telescoping members 59, the elevator cylinder 40, the king post 75, the pivot point P, the worm wheel 76, and a fragment of the worm 77.

FIGS. 9–11 show the rear wheel assembly RWA as comprised of three unit wheels mounted on a common axle. To swing the vehicle from the forward to the tuck position, the operator turns the rear wheel assembly angularly to its limit position, prior to, or concurrently with, driving the right front wheel forwardly. The rear wheel assembly RWA is turned, by driving the sprocket 63 rotationally in the proper direction, as by means of the fluid motors 65 shown in FIG. 10, thereby driving the chain 64 and rotating the sprocket 62. A stop lug 67 on the chain 64 is adapted to engage the limit stop 66, thereby establishing the limit position for the rear wheel assembly.

The fork lift vehicle V is provided, in the form now being described, with a front wheel drive. FIG. 16 illustrates one form of suitable drive system. In FIG. 16, the pivot point P, about which the vehicle swings as it is moved from forward to tuck position, and vice versa, is indicated as being located on the line between the two front wheels, close to the left front wheel. This location of the pivot point P corresponds to the axis of the king post 75. The front wheels are driven by a pair of drive motors 30, driving through the differential and change gearing 133 in housing 33. The differential and change gearing 133 is coupled to the right front wheel by way of output shaft 134, universal coupling 135, drive shaft 36, universal coupling 138, bevel gearing 139, shaft 140, transfer gearing 141 and the right wheel drive 142. The differential gearing 133 is connected to the left front wheel LFW through output shaft 234, drive shaft 35, etc.

When the vehicle is to be swung from the forward to the tuck position, or vice versa, about the pivot point P (FIG. 16), the lock-out clutch 250 in the differential casing 33 is actuated to drive the gear 251 directly from the shaft 252. This has the result of driving drive shaft 35 in a direction of rotation opposite from that shown by the solid line arrows in FIG. 16, and the left front wheel is therefore driven in the reverse direction from that in which the right front wheel is driven. The gear change arrangement in casing 33 is so selected that when the left front wheel is driven in the reverse direction from that of the right front wheel, the left wheel rotates at a substantially lower rate than does the right wheel, thereby pivoting the vehicle about the pivot point P, located inward of the left front wheel as hereinabove described.

FIG. 18 illustrates a drive system for a vehicle in which the king post and pivot point P′ are located directly over the left front wheel. The drive system of FIG. 18 is generally similar to that of FIG. 16 except that the differential 333 is more conventional. Similar parts in FIG. 18 are identified by the same reference numerals used in FIG. 16. When the vehicle's king post is located directly over the left front wheel, and the drive system of FIG. 18 is used, the vehicle may be swung about the pivot point P′ by merely locking the left front wheel, as by means of brake 243, while the right front wheel is driven through the differential gearing 333.

When the vehicle is swung about the pivot point P (or P′), the center of gravity remains within the triangulation formed by the two spaced-apart front wheels and the rear wheel assembly. This is illustrated in FIG. 20, where the triangulation referred to above is indicated by the dot-and-dash lines marked T. The king post 75 and pivot point P are indicated as being located on the line which joins the centers of the front wheels, and somewhat inward from the left front wheel. The locations of the centers of gravity for the vehicle illustrated in FIG. 5 and in other figures, of the present application, under the different conditions to be defined below, are indicated by the small circles identified by the reference numerals 91, 92, 93 and 94.

Circle 91 represents the center of gravity under full load when stacking. Full load may, for example, be 15,000 pounds. Stated another way, the location of the center of gravity of the vehicle with maximum load when in the forward position is indicated by circle 91.

When the vehicle, with full load, is moved from the forward or stacking position to the tuck or stow or carry position, the center of gravity moves rearwardly along the line 95 to the location indicated by circle 92. Conversely, when the fully loaded vehicle swings from the tuck position to the forward position, the center of gravity moves forward from 92 to 91. Note, however, that the center of gravity remains within the triangulation T. This characteristic of the vehicle is very important, for it indicates that the vehicle is stable when fully loaded in any position between forward and tuck.

The centers of gravity for the vehicle when empty are indicated by the circles 93 and 94, 93 being the location of the center of gravity of the empty vehicle when in the forward or stacking position, and 94 being the location of the center of gravity of the empty vehicle when in the tuck or carry position. Again, the centers of gravity are within the triangulation T, indicating that the vehicle is also stable when carrying no load.

If, when the vehicle is swung from forward to tuck position, or vice versa, the load is heavy and the ground or floor is level, there will be little or no change in the position of the load as the vehicle swings thereunder, or out from thereunder. On the other hand, if the load is light, or if the ground or floor slants, there will be a tendency for the load to move in the same direction of rotation as the vehicle. To assure that the load remains stationary, relative to ground, when the vehicle is swung, automatic means are provided to drive the mast M rotationally when the vehicle is swung. Such means will now be described.

Referring again momentarily to FIGS. 16 and 18, it will be seen that in each of the systems shown in these figures, in addition to driving the front wheels of the vehicle (through the shafts and gearing illustrated and described), the drive motors 30 also drive a gear 82 which drives a hydraulic pump 80 through a clutch 81. Clutch 81 may preferably be an electrically operative magnetic clutch, operable by the operator of the vehicle to engage the clutch and drive the hydraulic pump 80 when the vehicle is to be swung from forward to tuck position, or vice versa. Pump 80 is connected, by fluid conduit lines not shown, to fluid motor 79 which drives the worm shaft 78 through coupling 74. The gear 82, pump 80, fluid motor 79, worm 77, and worm wheel 76 are so designed, and have such relationship to each other, that for each revolution of the driven right front wheel RFW, the king post 75 will be rotated a finite degree of rotation in a direction opposite to that in which the vehicle is being swung, so that when the vehicle has, for example, swung from the forward to the tuck position, through an arc of 90° about pivot point P, there will be 180° between the vehicle and the load, as measured along the projected swing arc of the vehicle.

Instead of driving the king post 75 from the pump 80 through the worm and worm wheel arrangement, as illustrated in FIG. 6 and described above, the king post 75 may be driven by a hydraulic system, such as is illustrated in FIG. 19.

Referring now to FIG. 19, mounted in coaxial alignment with the axis of king post 75 (which is also the pivot point P) is a fluid rotary actuator 85, supported on housing 71 and having a shaft 86 connected to king post 75 for driving the post 75 angularly through the desired number of degrees of rotation. Inserted in the fluid conduit lines between the pump 80 and the rotary actuator 85 is a manually operable compensating control 84, consisting of a fluid differential 87 driven by a fluid motor 88. When the compensating control 84 is in normal condition, the differential 87 functions as a direct connection and the drive motors 30 drive gear 82, which in turn drives the pump 80 through the clutch 81, and the pump 80 drives the rotary actuator 85. The gear 82, pump 80 and the actuator 85 are so designed in relation to each other, and in relation to the front wheel drive, such as has been described in connection with FIG. 16, that for each revolution of the right front wheel RFW, the king post 75 is moved through a finite degree of rotation so that for each degree of rotation of the vehicle along its swing arc, the mast M and the load on the fork are moved one degree of rotation in the opposite direction relative to the vehicle. For example, when the vehicle is swung through an arc of 90° from the forward to the tuck position, the load is rotated by the driven king post through an arc of 90° in the opposite direction.

The purpose of the compensating control 84 is to allow the operator of the vehicle to compensate for wheel slippage. It will be understood that if the driven right front wheel slips on the ground or floor and fails to swing the vehicle through the designed angular movement for each revolution of the wheel, the angular separation between the vehicle and the mast will depart from that intended, and the load will tend to move angularly relative to ground. When the operator observes that the load is tending to swing away from its intended stationary position, he operates the manual control 89 to operate the fluid differential 87 and the rotary actuator 85 is, as a result, driven at either a slower (or faster) rate of rotation.

FIG. 17 is a schematic illustration of one form of hydraulic control system suitable for controlling the operation of a fork lift vehicle of the type illustrated in the drawings and described hereinabove. Pump 31, shown in FIG. 1, supplies the hydraulic pressure required for certain portions of the system. It is not believed to be necessary to describe in detail the operations of the lift cylinder, nor the tilt cylinders, nor the braking or steering systems, since the present invention is not directed to these portions of the vehicle. One means by which the king post 75 and mast M are driven rotationally relative to the chassis and in an arcuate direction opposite to that in which the chassis is being driven by the right front wheel, has already been described, and the hydraulic system which is associated with such means is shown in FIG. 17 under the head "Swing System." Included in FIG. 17 in the hydraulic diagram for the "Swing System" are such elements as the driving gear 82, clutch 81 and swing pump 80, previously discussed. When the operator desires to swing the vehicle under the load, he operates a switch which engages the clutch 81 and energizes the solenoid K. Pump 80 drives the fluid motor 79 which drives the worm 77 and worm wheel 76 to rotate the king post 75, thereby to rotate the mast M relative to the vehicle. Valve 96 is a fluid replenishing valve.

In order to compensate for any slippage of the wheels on the floor or other surface on which the vehicle is operating, a hydraulic differential or compensator 187 is introduced for driving the swing motor 79 either slower or faster to accommodate the slip error. The pump motor 97 for correcting this error is inserted across the closed circuit of the swing pump 80 and swing motor 79. A separate hydraulic motor 98 drives the differential pump 97 and is controlled by a manual valve 189 which selects faster or slower movement, as required to compensate for any slip errors. To avoid the necessity of moving the lever of hand valve 189 in different directions for the swing forward and tucking operations, a direction corrector valve 99 is inserted in the line to reverse automatically the fluid flow predicated on which direction the mast M is being moved.

While the swing system in FIG. 17 shows the system described hereinbefore which employs worm 77 and worm wheel 76 to drive the king post, it is to be understood that in lieu thereof a rotary actuator 85 may be employed, as described in connection with FIG. 19.

While in its preferred form, the vehicle has two front wheels and only a single tail wheel assembly (preferably a 3-unit tail wheel assembly), it is to be understood that the vehicle of the present invention may, if desired, be equipped with four (or more) wheels, two front and two rear, the rear wheels being pivotal and steerable, the front wheels being fixed and driven. Moreover, the two front wheels may each be driven by its own motor, electric or hydraulic.

It will be understood from the foregoing description, that the invention provides a fork lift vehicle in which the mast is cantilever suspended from a king post supported at a corner of the vehicle, the center axis of the king post being the pivot point about which the vehicle and mast are both swingable. The pivot point is located on the line between the centers of the front wheels, close to one of the wheels. The king post and mast are rotatable, by driving means, about the king post axis to pivot the fork and load relative to the vehicle in a direction opposite to that in which the vehicle is swinging, thereby to maintain the load stationary relative to ground. The center of gravity of the vehicle and load for all fork loads between zero and maximum, and for all operating positions of the chassis relative to the mast, is within the triangulation of the wheels of the vehicle, thereby requiring less counter-balancing, and enabling heavier loads to be handled by a lighter weight vehicle.

Having described my invention, I claim:
1. A fork lift vehicle comprising:
   (a) a chassis;
   (b) two spaced-apart front wheels, one at each front corner of the chassis, and a steerable rear wheel assembly located intermediate the side edges of the chassis
   (c) a vertically disposed pivot post supported for rotation in a front corner portion of said chassis over the center of one of said front wheels;
   (d) a fork lift mast having a fork for supporting a load;
   (e) cantilever support means mounted on said pivot post for supporting said mast to one side only of said pivot post;
   (f) drive means for driving one of said front wheels in one direction at one speed and the other of said front wheels in a second direction at a different speed from said one speed, thereby to swing said vehicle about the axis of rotation of said pivot posts;
   (g) means for rotating said pivot post in a direction counter to that in which said vehicle is swung for maintaining the fork-supported load substantially stationary relative to ground while said vehicle is being swung about said pivot post so that the center of gravity of the vehicle is located within the triangulation formed by the said two front wheels and said steerable rear wheel assembly for all fork loads from zero to maximum and for all operating positions of the chassis relative to the mast.

References Cited

UNITED STATES PATENTS

| | | | |
|---|---|---|---|
| 2,753,066 | 7/1956 | Arnot | 214—671 |
| 3,003,586 | 10/1961 | Loef et al. | 214—671 |
| 3,098,574 | 7/1963 | De Marco | 214—674 |
| 3,182,826 | 5/1965 | Mutto | 214—75 |
| 3,189,205 | 6/1965 | Quayle | 214—670 |
| 3,259,257 | 7/1966 | Brown et al. | 214—670 XR |
| 3,313,436 | 4/1967 | Mathew et al. | 214—670 |

FOREIGN PATENTS

| | | |
|---|---|---|
| 1,035,569 | 7/1958 | Germany. |
| 1,060,789 | 7/1959 | Germany. |
| 1,063,968 | 8/1959 | Germany. |
| 728,362 | 4/1955 | Great Britain. |
| 828,460 | 2/1960 | Great Britain. |
| 510,062 | 1/1955 | Italy. |
| 44,009 | 12/1960 | Poland. |

GERALD M. FORLENZA, Primary Examiner

R. B. JOHNSON, Assistant Examiner

U.S. Cl. X.R.

180—6.64, 26